(12) United States Patent
Slassi et al.

(10) Patent No.: US 11,573,664 B1
(45) Date of Patent: Feb. 7, 2023

(54) PLURAL TOUCH-SCREEN SENSOR TO PEN SYNCHRONIZATION

(71) Applicant: Microsoft Technology Licensing, LLC, Redmond, WA (US)

(72) Inventors: Matan Slassi, Herzelyia (IL); Lior Zagiel, Tel-Aviv (IL); Assaf Cohen, Modiin (IL); Netanel Hadad, Lod (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/660,197

(22) Filed: Apr. 21, 2022

(51) Int. Cl.
| | | |
|---|---|---|
| G06F 3/041 | (2006.01) | |
| G06F 3/044 | (2006.01) | |
| G06F 1/16 | (2006.01) | |
| G06F 3/038 | (2013.01) | |
| G06F 3/0354 | (2013.01) | |

(52) U.S. Cl.
CPC ........ *G06F 3/04184* (2019.05); *G06F 1/1643* (2013.01); *G06F 3/0383* (2013.01); *G06F 3/03545* (2013.01); *G06F 3/0412* (2013.01); *G06F 3/0446* (2019.05); *G06F 3/04166* (2019.05); *G06F 2203/04104* (2013.01)

(58) Field of Classification Search
CPC .. G06F 1/1643; G06F 3/03545; G06F 3/0383; G06F 3/0412; G06F 3/04166; G06F 3/04184; G06F 3/0446; G06F 2203/04104; G06F 1/1647–1654
See application file for complete search history.

(56) References Cited

U.S. PATENT DOCUMENTS

| | | |
|---|---|---|
| 6,727,894 B1 | 4/2004 | Karidis et al. |
| 10,409,415 B2 * | 9/2019 | Sakabe ................ G06F 1/1616 |

(Continued)

FOREIGN PATENT DOCUMENTS

| | | |
|---|---|---|
| CN | 113220155 A | 8/2021 |

OTHER PUBLICATIONS

Lin, et al., "Position Estimation and Smooth Tracking with a Fuzzy-Logic-Based Adaptive Strong Tracking Kalman Filter for Capacitive Touch Panels", In Journal of IEEE Transactions on Industrial Electronics, vol. 62, Issue 8, Aug. 2015, pp. 5097-5108.

*Primary Examiner* — Michael Pervan
(74) *Attorney, Agent, or Firm* — Alleman Hall Creasman & Tuttle LLP

(57) ABSTRACT

A touch-screen system comprises adjacent first and second touch-screen sensors, first and second digitizers, and synchronization, tracking, and return logic. Each of the first and second digitizers is coupled electronically to the respective touch-screen sensor and configured to provide a pen signal responsive to action of a pen on the touch-screen sensor. The synchronization logic is configured to synchronize the pen to the first and second digitizers and to enable pen tracking by any of the first and second digitizers conditionally, based at least partly on the first and second pen signals. The tracking logic is configured to define a region of precision scanning of the first or second touch-screen sensor by the respective first or second digitizer, based at least partly on the first and second pen signals. The return logic is configured to expose a result of the precision scanning to an operating system of the touch-screen system.

20 Claims, 12 Drawing Sheets

(56) References Cited

U.S. PATENT DOCUMENTS

| | | | |
|---|---|---|---|
| 10,467,017 B2* | 11/2019 | Klein | G06F 9/4411 |
| 10,528,359 B2* | 1/2020 | Klein | G06F 1/32 |
| 10,788,934 B2* | 9/2020 | Klein | G06F 1/1694 |
| 10,884,547 B2* | 1/2021 | Klein | G06F 3/0487 |
| 10,970,026 B2* | 4/2021 | Klein | G06F 3/011 |
| 11,073,945 B1* | 7/2021 | Pundak | G06F 3/0383 |
| 11,449,295 B2* | 9/2022 | Klein | G06F 1/1616 |
| 2010/0182247 A1 | 7/2010 | Petschnigg et al. | |
| 2012/0194476 A1 | 8/2012 | Lee et al. | |
| 2014/0152576 A1 | 6/2014 | Kim et al. | |
| 2017/0308230 A1* | 10/2017 | Sakabe | G06F 3/0383 |
| 2018/0329508 A1* | 11/2018 | Klein | G06F 9/4411 |
| 2018/0329574 A1* | 11/2018 | Klein | G06F 1/1618 |
| 2018/0329718 A1* | 11/2018 | Klein | G06F 3/0418 |
| 2018/0330694 A1* | 11/2018 | Klein | G06F 3/03545 |
| 2020/0117473 A1* | 4/2020 | Klein | G06F 9/44505 |
| 2020/0341586 A1* | 10/2020 | Klein | G06F 1/1677 |
| 2021/0373715 A1 | 12/2021 | Sirpal et al. | |

* cited by examiner

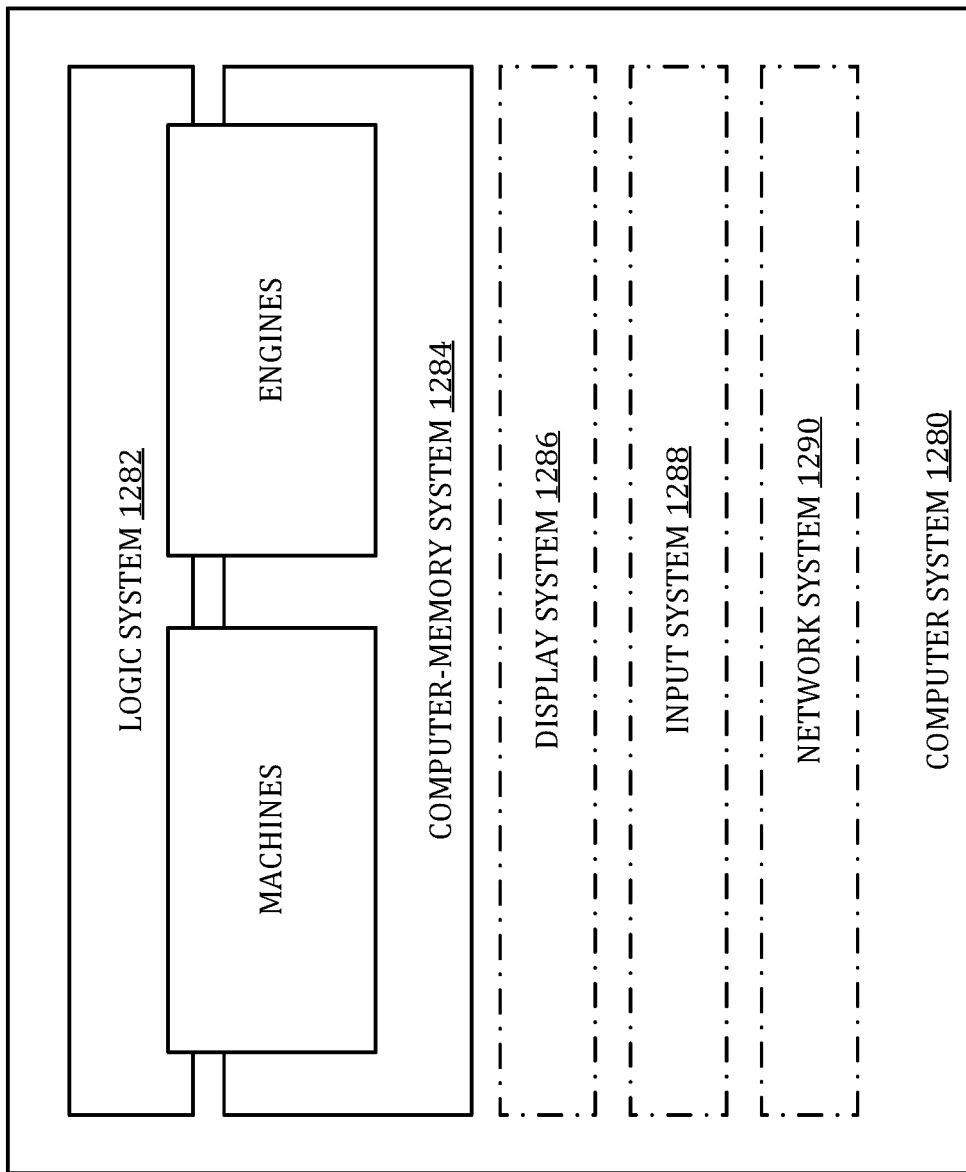

US 11,573,664 B1

PLURAL TOUCH-SCREEN SENSOR TO PEN SYNCHRONIZATION

BACKGROUND

A capacitive touch-screen sensor is an input component of many different kinds of electronic devices. In some electronic devices a touch-screen sensor comprises optically transparent material layered above or integrated within a display panel; such devices offer combined touch-screen display functionality. In some device configurations, two or more touch-screen sensors are used cooperatively to receive input over a corresponding two or more display panels.

SUMMARY

One aspect of this disclosure relates to a touch-screen system comprising adjacent first and second touch-screen sensors, first and second digitizers, and synchronization, tracking, and return logic. Each of the first and second digitizers is coupled electronically to the respective touch-screen sensor and configured to provide a pen signal responsive to action of a pen on the touch-screen sensor. The synchronization logic is configured to synchronize the pen to the first and second digitizers and to enable pen tracking by any of the first and second digitizers conditionally, based at least partly on the first and second pen signals. The tracking logic is configured to define a region of precision scanning of the first or second touch-screen sensor by the respective first or second digitizer, based at least partly on the first and second pen signals. The return logic is configured to expose a result of the precision scanning to an operating system of the touch-screen system.

Another aspect of this disclosure relates to a method for reporting a path of a pen over adjacent first and second touch-screen sensors of a touch-screen system. The method comprises: (a) receiving first and second pen signals; (b) synchronizing the pen to the first and second digitizers based at least partly on the first and second pen signals; (c) enabling pen tracking by any of the first and second digitizers conditionally, based at least partly on the first and second pen signals; (d) defining, based at least partly on the first and second pen signals, a region of precision scanning of the first or second touch-screen sensor by the respective first or second digitizer; and (e) exposing a result of the precision scanning to an operating system of the touch-screen system.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

FIG. 12 provides a schematic representation of an example computer system.

DETAILED DESCRIPTION

Figure 1A:
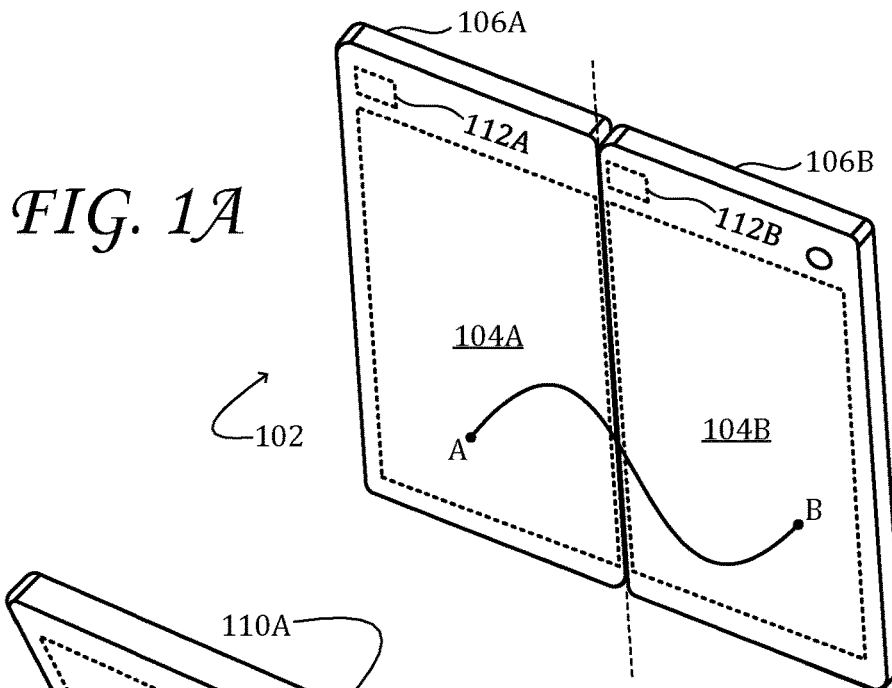
FIGS. 1A through 1C show aspects of a hinged touch-screen system.
Figure 1B:
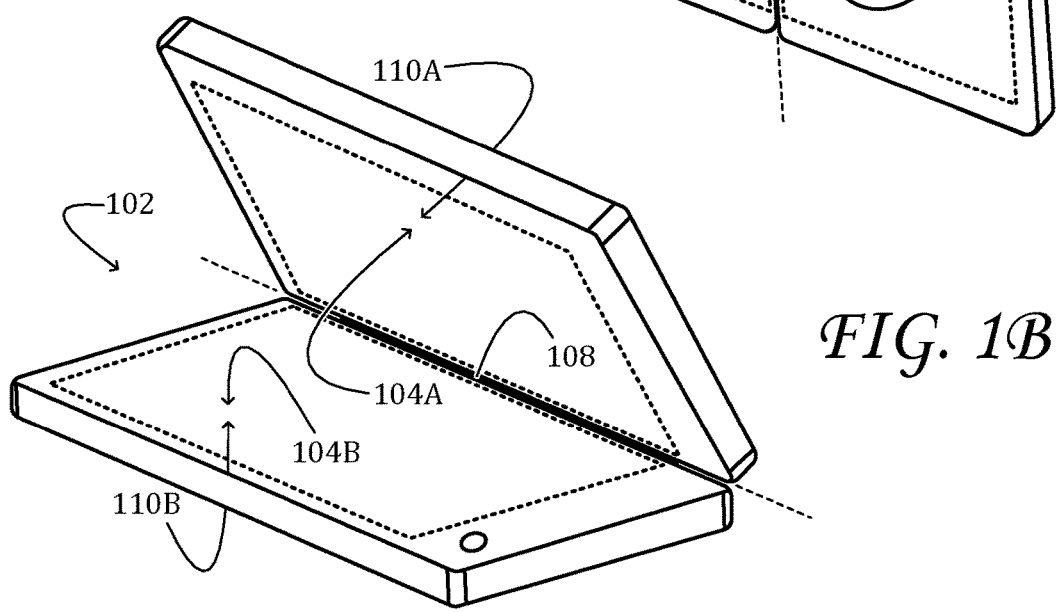
Figure 1C:
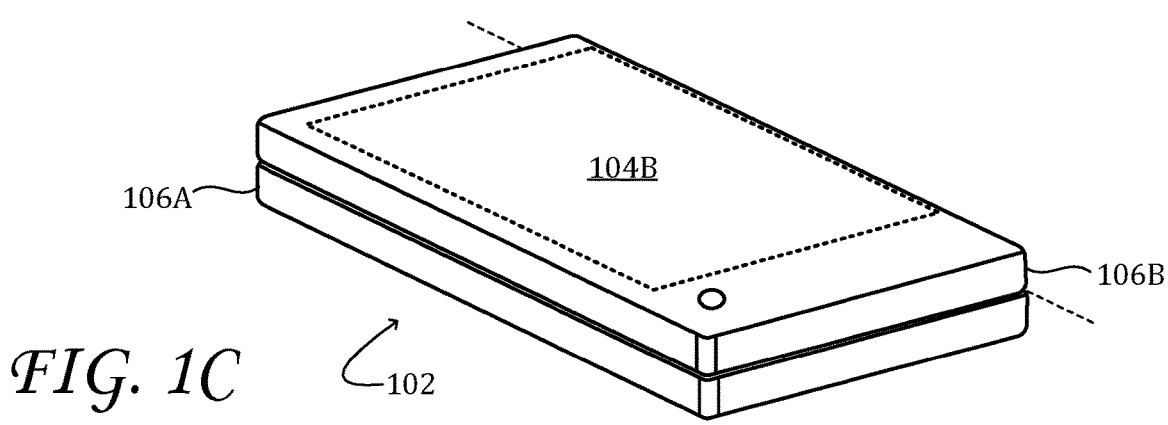
Figure 2:
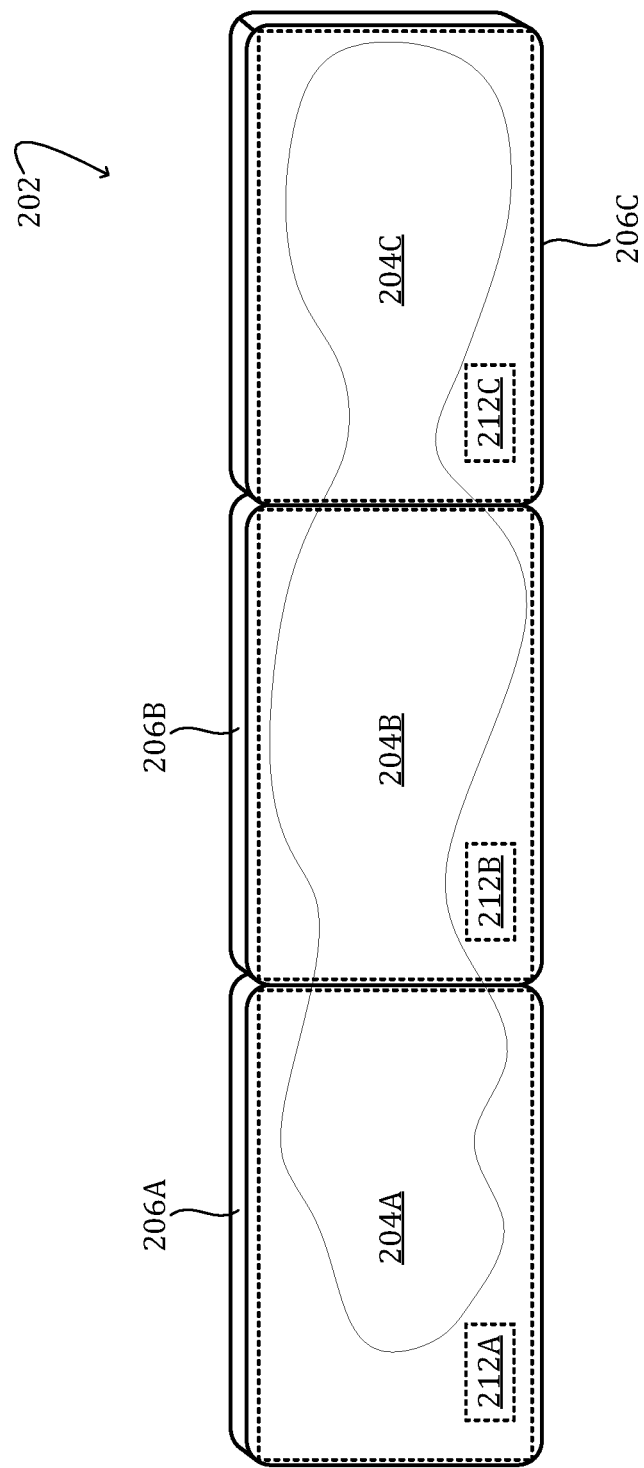
FIG. 2 shows aspects of another example touch-screen system.

FIGS. 1A through 1C show aspects of an example touch-screen system 102. The touch-screen system includes first touch-screen sensor 104A and adjacent second touch-screen sensor 104B. In the illustrated example, the touch-screen system is a foldable handheld device with opposing first and second enclosures 106A and 106B, connected via hinge 108. Within the first and second enclosures, first and second display panels 110A and 110B, and first and second digitizers 112A and 112B, are set behind the respective first and second touch-screen sensors. Coupled electronically to the respective first and second touch-screen sensors, the first and second digitizers are electronic circuits configured to interrogate and receive touch data from the touch-screen sensors. The display panels may comprise liquid-crystal display (LCD) or organic light-emitting diode (OLED) componentry in some examples. More generally, the touch-screen system may employ any kind display technology, or none at all. In the illustrated example, rotation of the first and second enclosures about the axis of the hinge allows the adjacent touch-screen sensors and associated display panels to be used in various orientations. In other examples a touch-screen system may include three or more touch-screen sensors and corresponding digitizers, and a hinge is not necessarily required. FIG. 2 shows an example tiled touch-screen system 202, in which the enclosures 206 of adjacent touch-screen sensors 204 and digitizers 212 are held in place by magnets.

One objective of this disclosure is to make adjacent touch-screen sensors of a touch-screen system operate cooperatively, in an apparently seamless manner, especially when used in conjunction with an electronic active stylus ('pen' herein). With continued reference to FIG. 1A, consider a scenario in which the user's pen draws a line from point A on touch-screen sensor 104A to point B on touch-screen sensor 104B. Even though the line traverses the seam between the adjacent touch-screen sensors, the desired function of the touch-screen system is to track the pen position seamlessly from one touch-screen sensor to the other, following the smooth line that the pen has drawn. More generally, it is desirable to configure the touch-screen system to process pen or touch input across any number of cooperating touch-screen sensors seamlessly, such that the touch-screen sensors function in unison.

One possible approach for achieving the desired function is to provide a shared driver to drive both touch-screen sensors. A disadvantage of that approach is that the many row-drive and column-sense lines connecting the distal touch-screen sensor to the shared driver would necessarily cross the hinge axis. Accordingly, those conductors would have to be engineered to tolerate repeated flexion, adding cost and creating a potential failure mode. Furthermore, in a tiled touch-screen system as illustrated in FIG. 2, the row-drive and column-sense lines would require dedicated contacts at the junctions between adjacent enclosures. These issues, among others, also diminish the scalability of the shared-driver configuration for touch-screen systems comprising three or more touch-screen sensors.

An alternative configuration, which avoids the above difficulties, is to provide a dedicated driver for each touch-screen sensor, as shown in the drawings above. Each dedicated driver is coupled directly to the corresponding touch-screen sensor, so none of the row-drive or column-sense lines need cross the hinge axis. The outstanding challenge with this approach, however, is that plural drivers may independently detect the same pen, providing conflicting synchronization requests to the pen, and ultimately tracking the pen position through different trajectories. Far from providing a seamless experience for the user, conflicting synchronization is liable to cause imprecise and/or choppy tracking over the seam, thereby degrading the user experience. In view of these issues, this disclosure sets forth configurations and methods for coordinated operation of plural touch-screen drivers, each coupled to a different touch-screen sensor of a touch-screen system. Coordination is provided at pen-detection, pen-synchronization, and pen-tracking stages, resulting in smooth reporting of the pen position, even in scenarios in which different drivers provide conflicting data.

Figure 3:
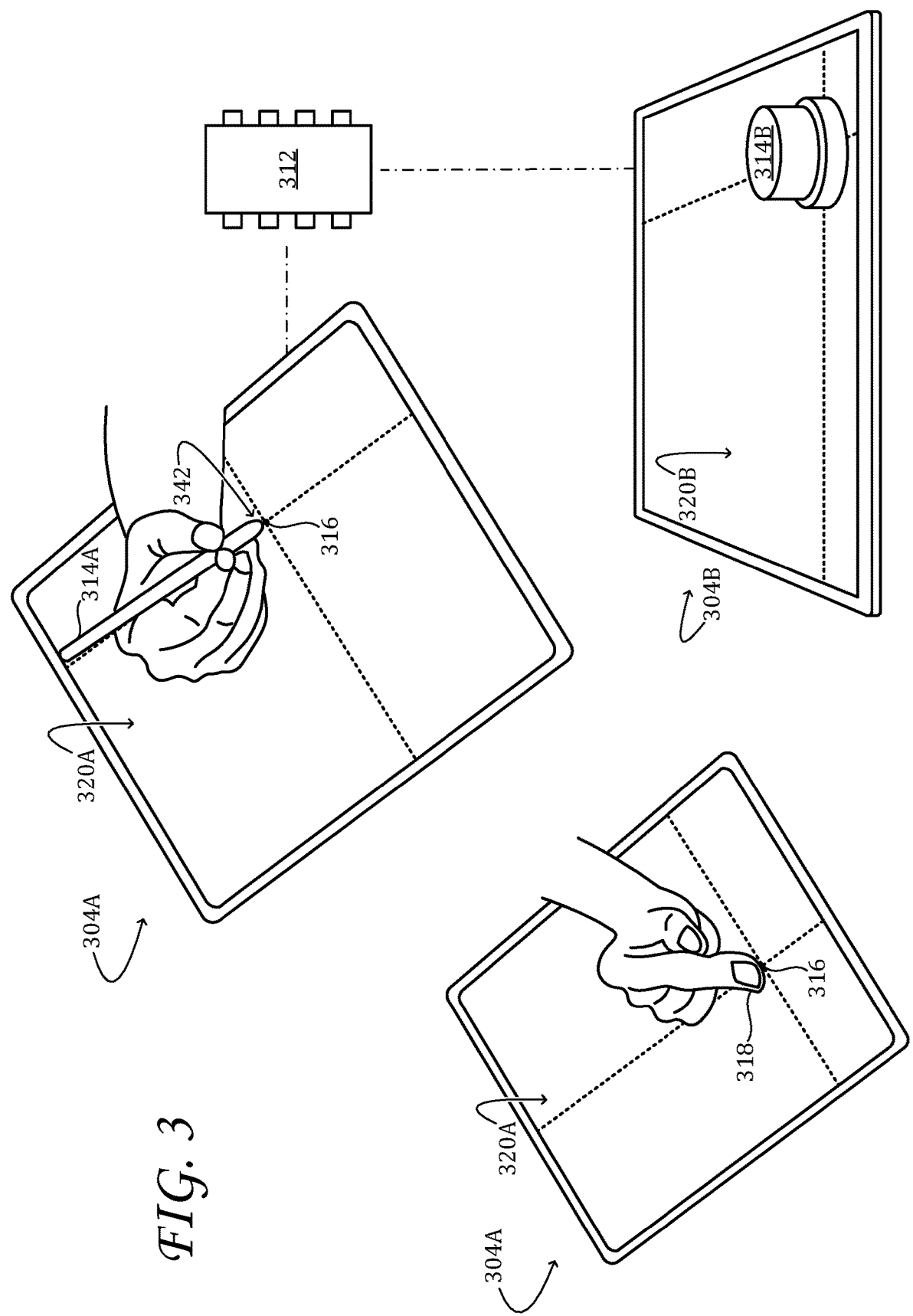
FIG. 3 shows aspects of example capacitive touch-screen sensors and pens.

FIGS. 3 through 6 provide example, non-limiting, context for the configurations and methods herein. FIG. 3 shows aspects of an example capacitive touch-screen sensor 304A, digitizer 312, and pen 314A. The touch-screen sensor is configured to sense at least one touch point 316 effected by the user. An example touch point is the point of contact between the user's fingertip 318 and sensory surface 320A of the touch-screen sensor.

Figure 4:
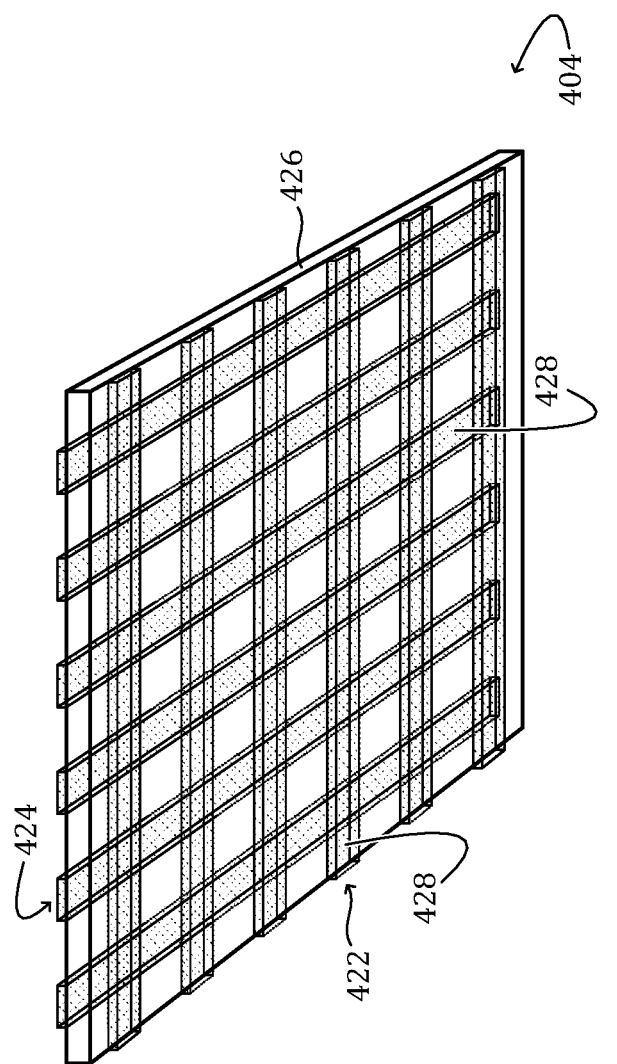
FIG. 4 shows additional aspects of an example touch-screen sensor.

FIG. 4 shows aspects of an example capacitive touch-screen sensor 404 in expanded detail. The capacitive touch-screen sensor comprises a series of row electrodes 422 that cross a series of column electrodes 424. Touch-screen sensors here contemplated may include any number N of row electrodes and any number M of column electrodes. Although it is customary to have the row electrodes aligned horizontally and the column electrodes aligned vertically, that aspect is in no way necessary, as the terms 'row' and 'column' may be exchanged everywhere in this description. In the illustrated example, the series of row electrodes 422 is arranged on one face of a dielectric layer 426, and the series of column electrodes 424 is arranged on the opposite face of the dielectric layer. The dielectric layer may be 50 to 100 µm in some examples, although other thickness ranges are also envisaged. The dielectric layer may comprise a polymer film, such as polyethylene terephthalate (PET). In curved, flexible and/or bendable touch-screen systems, the dielectric layer may be curved, flexible and/or bendable. Row electrodes 422 and column electrodes 424 each comprise electronically conductive material 428 distributed in the form of narrow (e.g., one mm-wide), elongate bands on the opposite faces of dielectric layer 426. Adjacent electrodes may be separated by one to five millimeters in some examples. The composition of electronically conductive material 428 is not particularly limited. The electronically conductive material may comprise a metallic microwire mesh, a metal-particle or metal-island film, or a film of a degenerately doped semiconductor, such as indium-tin oxide (ITO), for instance. Irrespective of the implementation, a capacitive touch-screen sensor comprising row and column electrodes of relatively low resistance and high optical transmittance is desirable.

Figure 5:
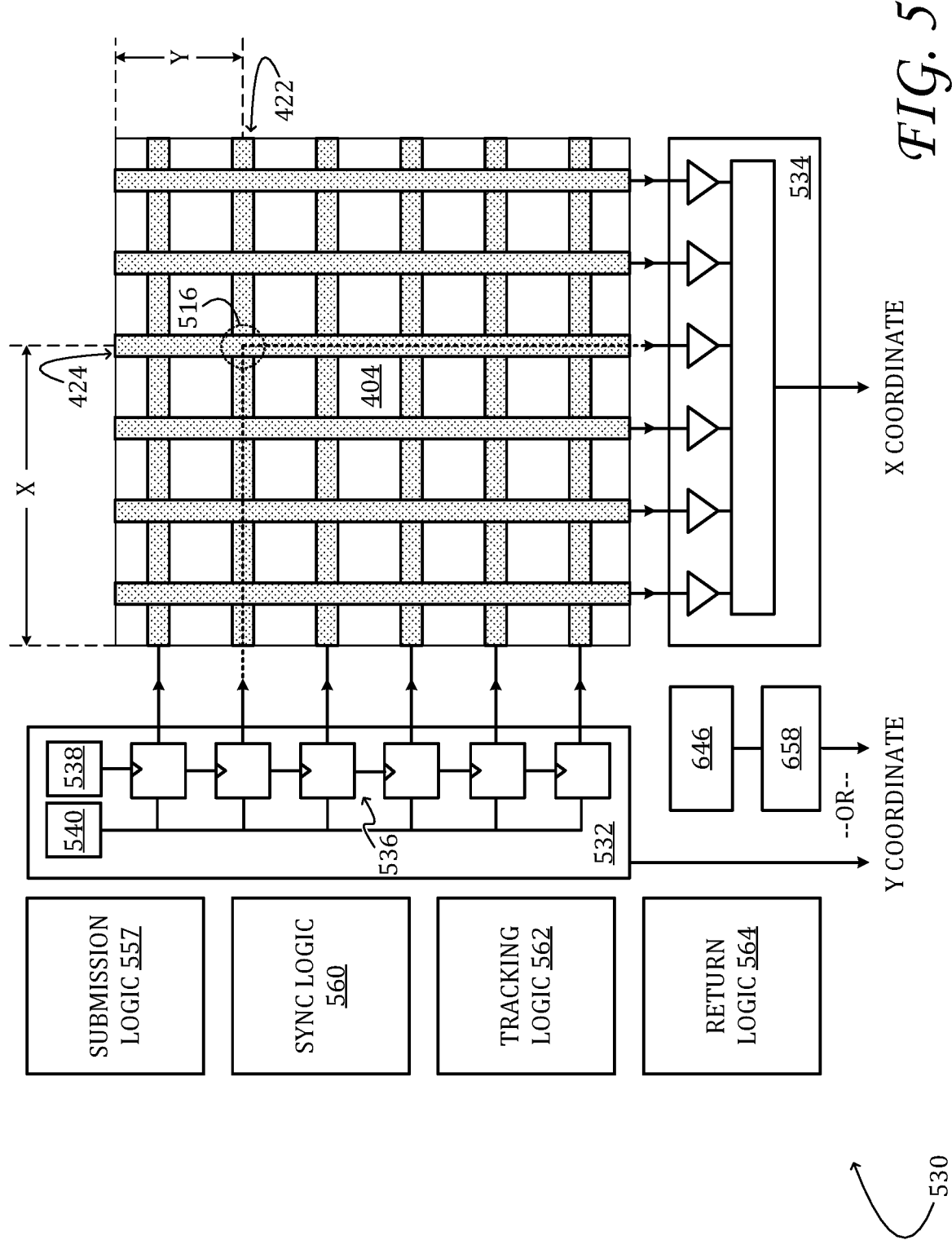
FIG. 5 shows aspects of an example touch-screen sensor and digitizer.

Turning now to FIG. 5, row electrodes 422 and column electrodes 424 of capacitive touch-screen sensor 404 are addressed by digitizer 530. The digitizer is configured to sense contact on or near the sensory surface of the touch-screen display device, including coordinates (X, Y) directly beneath a point of contact of a finger, pen, or other touch input on the sensory surface. To that end, the digitizer includes row-drive circuit 532 and column-sense circuit 534. The terms 'row-drive' and 'column-sense' are appropriate for configurations in which drive signal is driven through the row electrodes and sensed via the column electrodes. Naturally, the opposite configuration is also envisaged.

Column-sense circuit 534 is configured to sense a column signal from the series of column electrodes 424. In the illustrated example, the column-sense circuit includes M column amplifiers, each coupled to a corresponding column electrode. Row-drive circuit 532 includes a local row counter 536 in the form of an N-bit shift register with outputs driving each of N row electrodes 422. The local row counter is clocked by row-driver clock 538. The local row counter includes a blanking input to temporarily force all output values to zero irrespective of the values stored within the shift-register. Excitation of one or more rows may be provided by filling the local row counter with ones at every output to be excited, and zeroes elsewhere, and then toggling the blanking signal with the desired modulation from modulation clock 540. In the illustrated example, the output voltage may take on only two values, corresponding to the one or zero held in each bit of the local row counter. In other examples, the output voltage may take on a greater range of values, to reduce the harmonic content of the output waveforms or decrease radiated emissions, for instance. In some examples, row-drive circuit 532 may include one or more additional registers offset with respect to local row counter 536 and blanked by modulation clocks of different frequencies. Such variants enable concurrent excitation of two or more row electrodes (e.g., electrodes separated by a fixed number of intervening rows).

Row-drive circuit 532 of FIG. 5 applies an excitation pulse to each row electrode 422 in sequence. In this manner, the row-drive circuit is configured to concurrently drive one or more row electrodes of the series of row electrodes while leaving undriven one or more other row electrodes of the series of row electrodes. During a period in which the sensory surface is untouched, none of the column amplifiers registers an above-threshold output. However, the electrical impedance at each crossing of a row electrode 422 and a column electrode 424 is responsive to the proximity of a finger or stylus to that crossing: when the user places a fingertip on the sensory surface, the fingertip capacitively couples one or more row electrodes 422 proximate to (e.g., crossing) touch point 516 to one or more column electrodes 424 also proximate to the touch point. The capacitive coupling induces an above-threshold signal from the column amplifiers associated with the column electrodes behind the touch point.

Column-sense circuit 534 returns, as the X coordinate of the touch point, the numeric value of the column providing the greatest signal received. Digitizer 512 determines which row was being excited when the greatest signal was received and returns the numeric value of that row as the Y coordinate of the touch point. In some examples, column-sense circuit 534 may also return a Z coordinate that varies in dependence on the strength of the signal received at coordinates (X, Y). Accordingly, digitizer 512 may distinguish firm touch, associated with strong signal, from light touch, associated with weaker signal, and from hover, associated with still weaker but detectable signal.

Returning briefly to FIG. 3, pen 314A may be used in lieu of the user's fingertip to execute touch input on touch-screen sensor 304A. Accordingly, the touch-screen sensor may be configured to sense the position of pen tip 342 relative to sensory surface 320A. Like the user's fingertip, the tip of a passive pen comprises a high dielectric-constant material that capacitively couples the row and column electrodes under the touch point. A passive pen offers better touch accuracy than the fingertip, and may reduce smudging of the sensory surface. Although it is typical for a touch-screen input device to take the form of an elongate cylinder, that aspect is not strictly necessary. FIG. 3 shows an alternatively shaped touch-screen input device 314B usable on a large-format touch-screen sensor 304B. It will be noted that touch-screen input devices of various shapes and sizes are envisaged herein and all references to a 'pen' apply equally to other touch-screen input devices.

Figure 6:
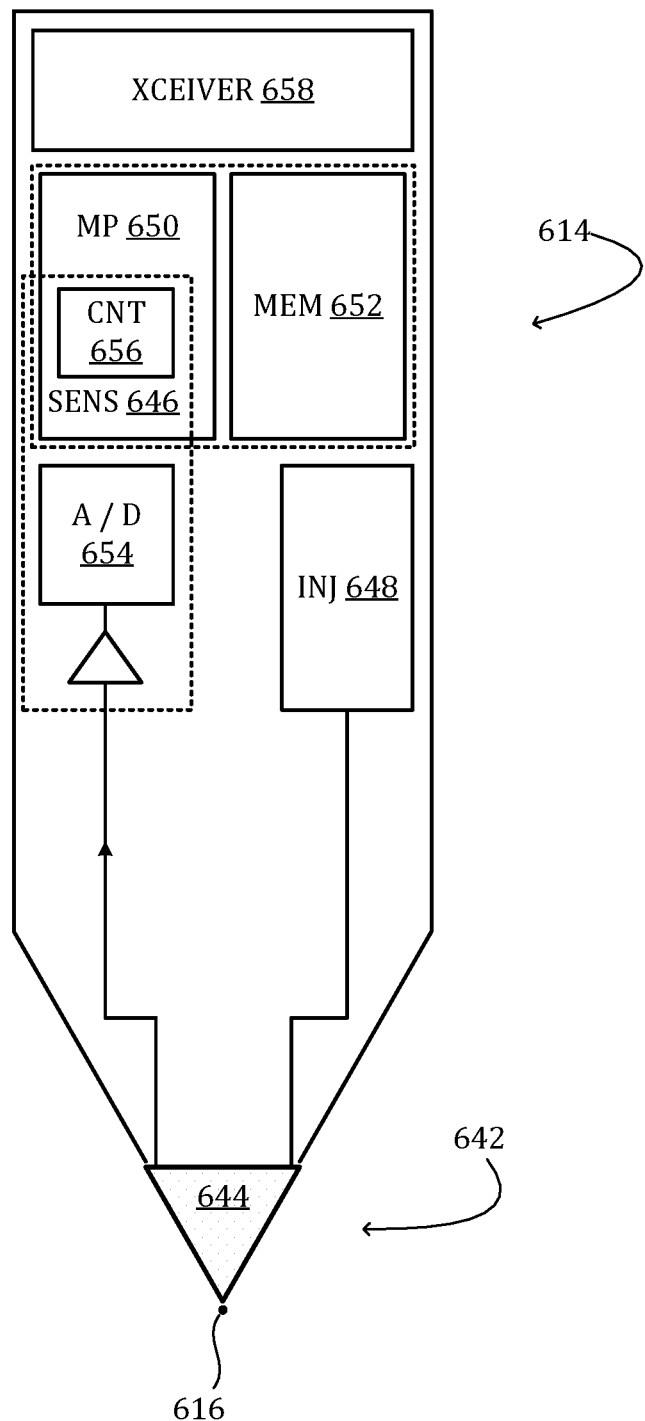
FIG. 6 shows aspects of an example pen configured to provide input on a touch-screen sensor.

Relative to a passive touch-screen pen, an active pen offers even greater touch accuracy, in addition to faster and more accurate tracking of the touch point. FIG. 6 shows aspects of an example active pen 614. In FIG. 6, probe electrode 644 is arranged at tip 642 of active pen 614. The probe electrode is coupled operatively to associated sensory logic 646 and injection logic 648. The sensory and injection logic are coupled to, and may be embodied partially within, microprocessor 650, which is configured for digital signal processing (DSP). The microprocessor is coupled operatively to computer memory 652. Sensory logic 646 includes linear analog componentry configured to maintain probe electrode 644 at a constant voltage and to convert any current into or out of the probe electrode into a proportional current-sense voltage. The sensory logic may include an analog-to-digital (A/D) converter 654 that converts the current-sense voltage into digital data to facilitate subsequent processing.

Instead of capacitively coupling row and column electrodes of the capacitive touch-screen sensor via a dielectric, sensory logic 646 of active pen 614 senses the arrival of an excitation pulse from row electrode 422, behind touch point 616, and in response injects charge into column electrode 424, also behind the touch point. To that end, injection logic 648 is configured to control charge injection from the probe electrode 644 to the column electrode directly beneath the probe electrode. The injected charge appears, to column-sense circuit 534, similar to an electrostatic pulse delivered via capacitive coupling of the column electrode to an energized row electrode intersecting at the touch point.

In some examples, sensory logic 646 and injection logic 648 are active during non-overlapping time windows of each touch-sensing frame, so that charge injection and charge sensing may be enacted at the same probe electrode 644. In this implementation, digitizer 512 excites the series of row electrodes 422 during the time window in which the sensory logic is active, but suspends row excitation during the time window in which the pen 614 may inject charge. This strategy provides an additional advantage, in that it enables digitizer 512 to distinguish touch points effected by pen 614 from touch points effected by a fingertip or palm. If column-sense circuit 534 detects charge from a column electrode 424 during the charge-injection time window of the pen 614 (when none of the row electrodes 422 are excited), then touch point 616 detected must be a touch point of the pen. However, if the column-sense logic detects charge during the charge-sensing window of the pen (when row electrodes 422 are being excited), then the touch point detected may be a touch point of a fingertip, hand, or passive pen, for example.

When receiving the signal from a row electrode 422, the pen 614 may inject a charge pulse with amplitude proportional to the received signal strength. Capacitive touch-screen sensor 404 receives the electrostatic signal from pen 614 and calculates the Y coordinate, which may be the row providing the greatest signal from the pen, or a function of the signals received at that row and adjacent rows.

Active sensing followed by charge injection enables a touch point 616 of a very small area to be located precisely, and without requiring long integration times that would increase the latency of touch sensing. Nevertheless, this approach introduces certain challenges related to noise suppression. Various solutions—for example, code division or frequency division multiple access—may be applied to cancel the strong interference at the receiving direction from the transmitting direction. The capacitive touch-screen sensor may be required to receive two signals simultaneously (one from the row electrode 422, and the other from probe electrode 644). Another solution is to require pen 614 to assume a more active role in determining the touch point coordinates. In the illustrated example, sensory logic 646 of the active pen 614 includes a remote row counter 656, which is maintained in synchronization with local row counter 536 of digitizer 512. This feature gives the pen and the touch screen a shared timing, but without being wired together.

When probe electrode 644 touches the sensory surface, sensory logic 646 receives a waveform that lasts as long as the touch is maintained. The waveform acquires maximum amplitude at the moment in time when row electrode 422, directly beneath (i.e., adjacent) the probe electrode 644, has been energized. Sensory logic 646 is configured to sample the waveform at each increment of the remote row counter 656 and determine when the maximum amplitude was sensed. This determination can be made once per frame, for example.

Because active pen 614 and digitizer 512 have shared timing due to synchronized row counters, the state of local row counter 636 at maximum sensed amplitude reports directly on the row coordinate—i.e., the Y coordinate—of touch point 616. In order to make use of this information, the Y coordinate must be communicated back to digitizer 512. To this end, the pen includes transceiver 658 configured to wirelessly communicate the computed row coordinate to row-sense logic of the touch screen. This disclosure embraces various modes of communicating data, including the Y coordinate, from the pen to the touch screen.

In each of the variants noted above, among others, digitizer 512 is configured to provide a pen signal responsive to the action of a pen on the associated touch-screen sensor 404. In these examples, the pen signal comprises the analog output of column-sense circuit 534 with reference to the timing defined by sensory logic 646 of pen 614. In touch-screen systems comprising first and second touch-screen sensors, the first digitizer is configured to provide a first pen signal responsive to action of a pen on the first touch-screen sensor. Likewise, the second digitizer is coupled electronically to a second touch-screen sensor and configured to provide a second pen signal responsive to action of the pen on the second touch-screen sensor.

Returning briefly to FIG. 5, digitizer 512 includes submission logic 557, synchronization logic 560, tracking logic 562, and return logic 564. The submission logic is configured to submit any of the first and second pen signals conditionally to the synchronization logic, based at least partly on the first and second pen signals. The synchronization logic is configured to synchronize the pen to the first and second digitizers and to enable pen tracking by any of the first and second digitizers conditionally, based at least partly on the first and second pen signals. By way of example, the synchronization logic may synchronize remote row counter 656 (of FIG. 6) to each of the local row counters 536 (of FIG. 5) by adding a suitable numeric offset to any, some, or all of the counters. The tracking logic is configured to define a region of precision scanning of the first or second touch-screen sensor by the respective first or second digitizer, based at least partly on the first and second pen signals. The return logic is configured to expose a result of the precision scanning to an operating system of the touch-screen system. Defining a region of precision scanning provides a technical advantage of reducing the number of touch-screen electrodes that must be scanned in scenarios in which the prior pen position provides a rough estimate. As described in further detail below, conditional synchronization reduces the probability that the system will try to sync on random noise mistaken for pen signal, and conditional definition of the precision-scanning region reduces the probability that the region will be defined erroneously, again based on random noise.

Figure 7:
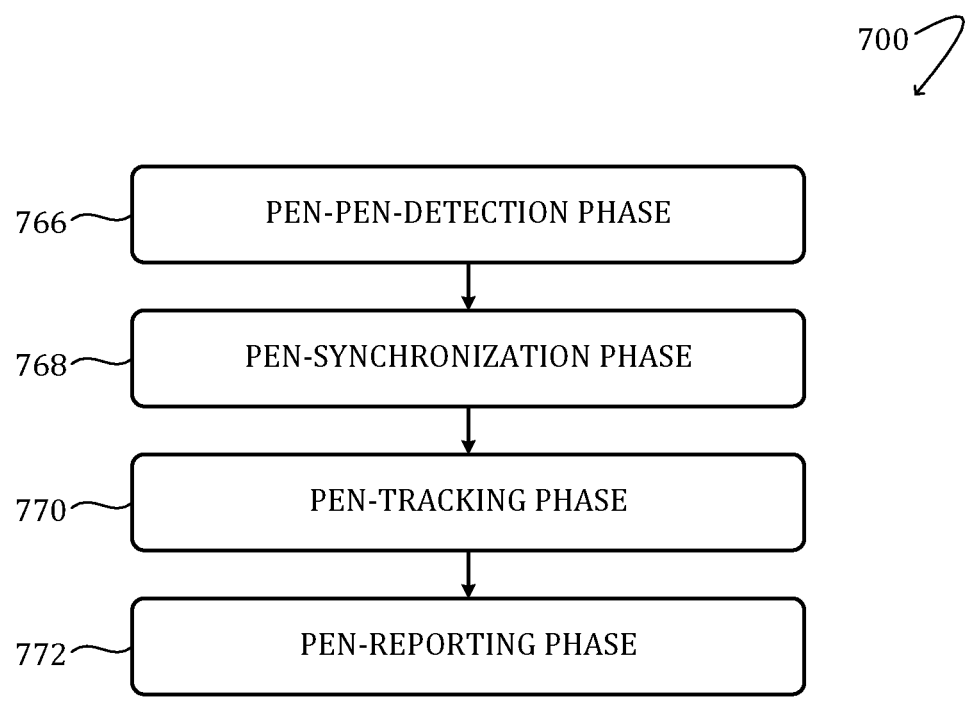
FIG. 7 shows aspects of an example method for reporting a path of a pen over adjacent first and second touch-screen sensors of a touch-screen system.

FIG. 7 shows aspects of an example method 700 for reporting a path of a pen over adjacent first and second touch-screen sensors of a touch-screen system. Method 700 is divided into four phases: pen-detection phase 766, pen-synchronization phase 768, pen-tracking phase 770, and pen-reporting phase 772. For ease of understanding, method 700 and subsequent methods are described with continued reference to the configurations hereinabove. It will be understood, however, that the same method may be supported by other configurations.

Figure 8:
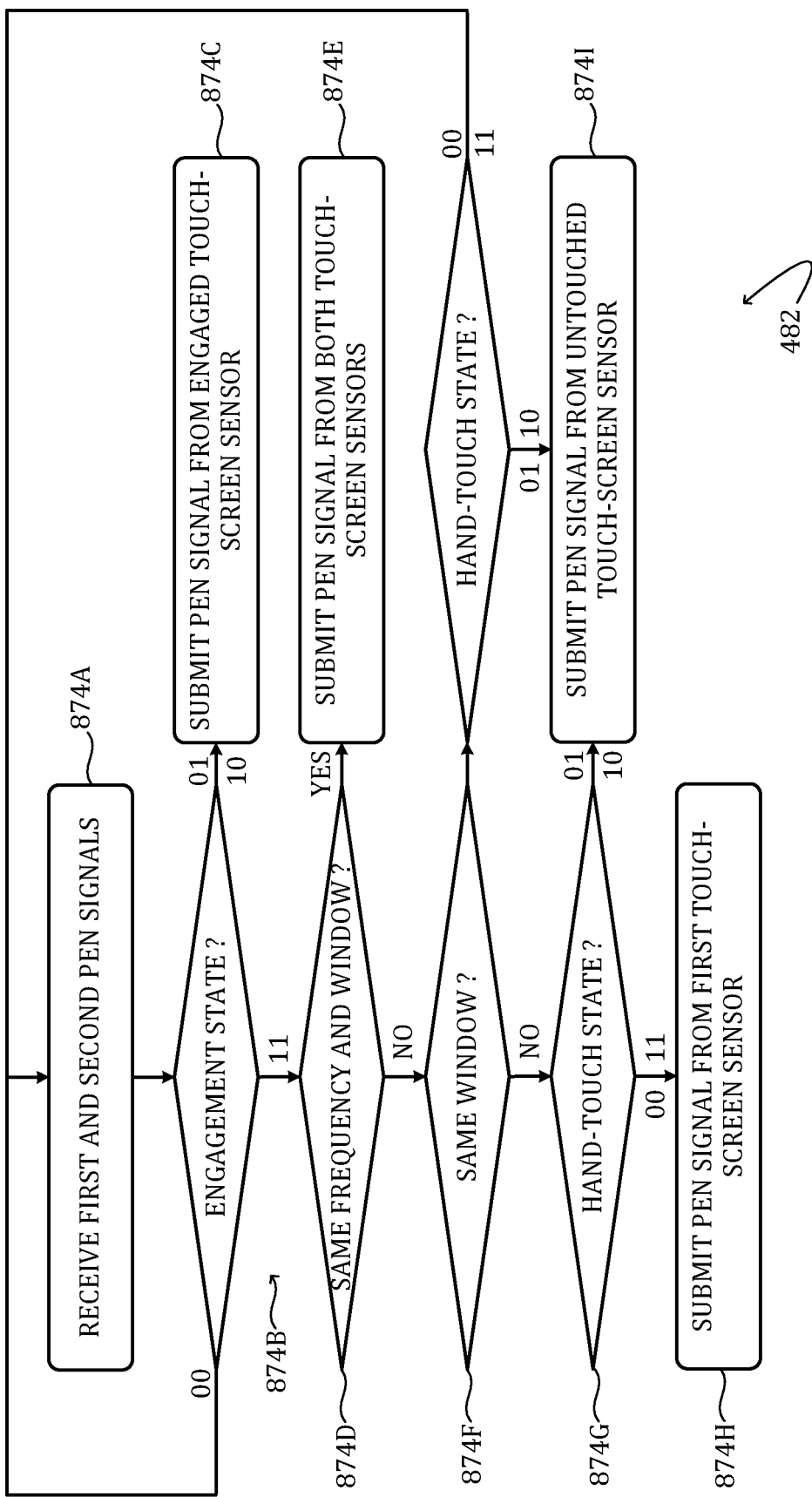
FIG. 8 shows aspects of an example pen-detection phase of the method of FIG. 7.

FIG. 8 shows aspects of an example pen-detection phase 766 of method 700. At 874A of the pen-detection phase, submission logic of the touch-screen system receives a first pen signal from the first digitizer of the touch-screen system and a second pen signal from the second digitizer of the touch-screen system. The first and second pen signals define an engagement state of the pen with respect to first and second touch-screen sensors of the touch-screen system. For a system of two touch-screen sensors, the engagement state may take binary values of 00, 01, 10, and 11. Engagement state 00 indicates that the pen is engaged on neither the first nor the second touch-screen sensor. Engagement states 01 and 10 indicate that the pen is engaged on only the first or second touch-screen sensor, respectively, and engagement state 11 indicates that the pen is engaged on the first and second touch-screen sensors concurrently. Thus, computing the engagement state based on the first and second pen signals provides the technical effect of exposing which of the sensors is engaged with (e.g., proximate to) the pen, so that this information can be made available to downstream processing.

In some scenarios, inadvertent contact between the user's hand and a touch-screen sensor contributes capacitively couples numerous row and column electrodes. The contact may involve the user's thumb, fingers, or palm (as shown in FIG. 3). Such coupling may impart noise in the pen signals, which is liable to interfere with pen-detection, -synchronization, and -tracking. Accordingly, method 700 makes use of information, sensed automatically by the digitizers, that reports on the extent of contact between the user's hand and the touch-screen sensors. More particularly, the first and second pen signals further define a hand-touch state of the first and second touch-screen sensors. For a system of two touch-screen sensors, the hand-touch state may take binary values of 00, 01, 10, and 11. Hand-touch state 00 indicates that the user's hand touches neither the first nor the second touch-screen sensor. Hand-touch states 01 and 10 indicate that the user's hand touches only the first or second touch-screen sensor, respectively, and hand-touch state 11 indicates that the user's hand touches the first and second touch-screen sensors concurrently. The engagement state and the hand-touch state may be evaluated by the submission logic of the touch-screen system and used at various stages in method 700.

In pen-detection phase 766 the submission logic of the touch-screen system submits any of the first and second pen signals conditionally to synchronization logic based at least partly on the first and second pen signals. The submission logic is configured to submit the any of the first and second pen signals based at least partly on the engagement state, the hand-touch state, and/or other factors, as illustrated below. Providing access to the engagement and hand-touch states in the submission logic provides the technical effect of leveraging previously assessed information about which sensor is engaged with the pen and whether that sensor is currently touched by the user's hand, which is relevant to deciding whether data from that sensor is likely to be usable signal or noise.

At 874B of pen-detection phase 766, the engagement state of the touch-screen system is interrogated. Engagement state 00 triggers the submission logic to return to 874A, where subsequent pen signals are received and processed. Engagement states 01 and 10 cause the submission logic to advance to 874C, where the pen signal corresponding to the engaged touch-screen sensor is submitted for synchronization to the pen. Under conditions in which the pen is engaged on both touch screen sensors concurrently, the submission logic is configured to submit the any of the first and second pen signals based at least partly on the frequency and/or timing of the first and second pen signals. Thus, in engagement state 11 the submission logic determines, at 874D, whether engagement on both touch-screen sensors was indicated based at least partly on pen signals of the same frequency, received in the same detection window. That condition suggests that both touch-screen sensors have sensed the same pen—e.g., a pen situated between adjacent touch screens. Accordingly, submission logic provides a technical benefit of leveraging information about the frequency and/or timing of the first and second pen signals to factor in the reliability of subsequent synchronization of the respective pen signals. In some non-limiting examples, pen signals may be received in 25 and 37 kHz bands during dedicated, non-overlapping timing windows; other frequency bands are also envisaged. In the event that both touch-screen sensors have sensed the same pen, the submission logic advances to 874E, where both the first and the second pen signals are submitted in parallel to the synchronization logic, resulting in synchronization of the first and second digitizers to the pen. However, if the first and second pen signals differ in frequency or are received within different detection windows, then the submission logic advances to 874F, where the differences are further resolved. In particular, if the first and second pen signals were received in different detection windows, then the hand-touch state is used to determine the next course of action. If the hand-touch state at 874G is 00 or 11 then neither pen signal is preferred, so the first synchronization signal only, at 874H, is used for synchronization to the pen. However, if the hand-touch state is 01 or 10 then the pen is synchronized to the second or first digitizer, respectively, at 874I—viz., to the digitizer corresponding to the untouched touch-screen sensor. Similar conditional logic with respect to the hand-touch state is used in the event that first and second pen signals of different frequency are received in the same detection window. In that event, however, pen signals corresponding to hand-touch states 00 and 11 are discarded as probable noise, and no synchronization is attempted.

Figure 9:
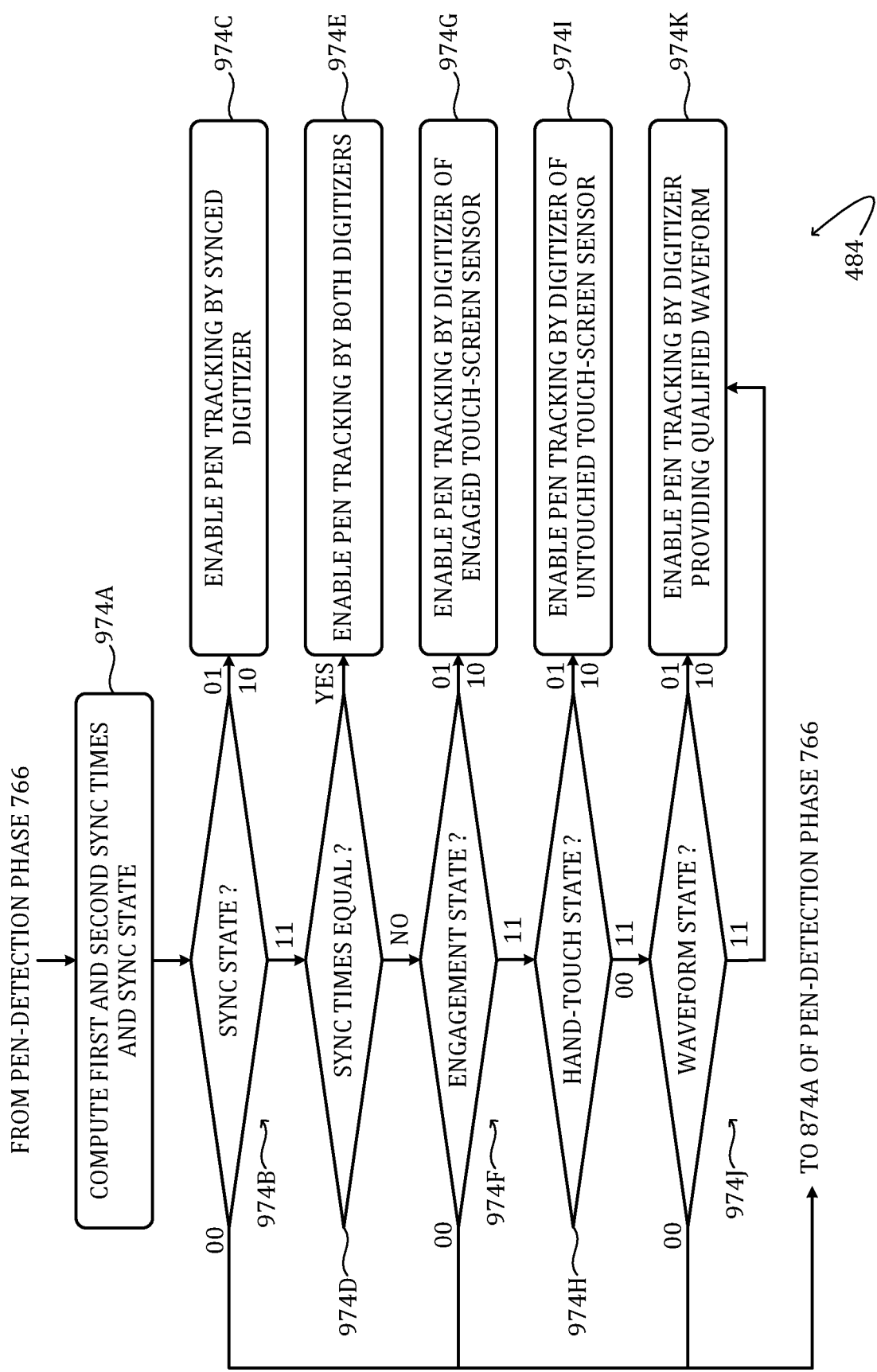
FIG. 9 shows aspects of an example pen-synchronization phase of the method of FIG. 7.

FIG. 9 shows aspects of an example pen-synchronization phase 768 of method 700. In pen-synchronization phase 768 the synchronization logic synchronizes the pen to the first and second digitizers based at least partly on the first and second pen signals. At 974A, the synchronization logic computes a first sync time between the pen and the first digitizer and a second sync time between the pen and the second digitizer. In some examples the first sync time is a timing offset between the local row counter of the first digitizer and the remote row counter of the pen, and the second sync time is a timing offset between the local row counter of the second digitizer and the remote row counter of the pen. From attempting to compute the first and second sync times, the synchronization logic yields a synchronization state, which may be used subsequently in method 700. For a system of two touch-screen sensors the synchronization state may take binary values of 00, 01, 10, and 11. Synchronization state 00 indicates that neither of the digitizers has 'passed sync'—i.e., the pen is synchronized neither to the first nor to the second digitizer. Synchronization states 01 and 10 indicate that the pen is synchronized only to the first or second digitizer, respectively, and synchronization state 11 indicates that the pen is synchronized to the first and second digitizers concurrently.

In pen-synchronization phase 768 the synchronization logic enables pen tracking by any of the first and second digitizers conditionally, based at least partly on the first and second pen signals. In some examples, the synchronization logic is configured to enable pen tracking based at least partly on the synchronization state as illustrated immediately below. Connecting the pen tracking decision to the sync time and/or synchronization state provides the technical effect of avoiding a situation in which any digitizer attempts to track the pen position based on noise, as opposed to signal.

At 974B, synchronization state 00 triggers the synchronization logic to return to 874A of pen-detection phase 766, where subsequent pen signals are received and processed. Synchronization states 01 and 10 cause the synchronization logic to advance to 974C, where pen tracking by the synchronized digitizer is enabled. Under some conditions, the synchronization logic is configured to enable the pen tracking conditionally based at least partly on the first and second sync times. In particular, at synchronization state 11, the synchronization logic compares the sync times of the two digitizers, at 974D. If the sync times are substantially the same, then the synchronization logic advances to 974E, enabling pen tracking by both the first and second digitizers. However, the synchronization logic is also configured, in the event that the sync time of the first digitizer differs from that of the second digitizer, to enable pen tracking conditionally based at least partly on the engagement state. In the illustrated example, the engagement state is again interrogated at 974F. If the engagement state is 01 or 10, indicating that the pen is engaged on only one of the digitizers, then pen tracking is enabled for the engaged digitizer, at 974G. Under other conditions, the synchronization logic is configured to enable pen tracking conditionally based at least partly on the hand-touch state. In particular, capacitive coupling among row and column electrodes due to inadvertent hand touch may impart noise in the pen signals, which is liable to interfere with pen synchronization and tracking. Accordingly, if the pen was engaged on both touch-screen sensors, via both digitizers, then the synchronization logic at 974H interrogates the hand-touch state. If the hand-touch state is 01 or 10, indicating that only one of the touch-screen sensors was untouched, then pen tracking is enabled, at 974I, for the digitizer corresponding to the untouched sensor. At this point the synchronization state for the other digitizer may be reset.

Figure 10:
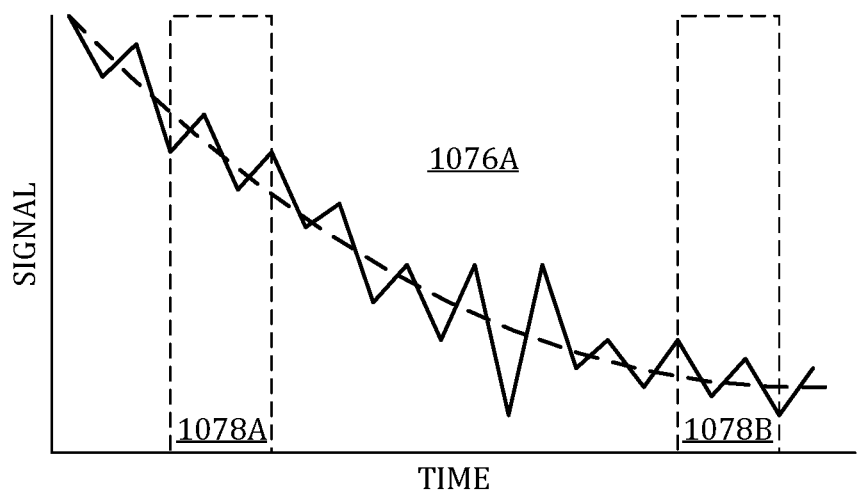
FIG. 10 is plot comparing two hypothetical pen signals sampled over earlier and later sampling windows.
Figure 10:
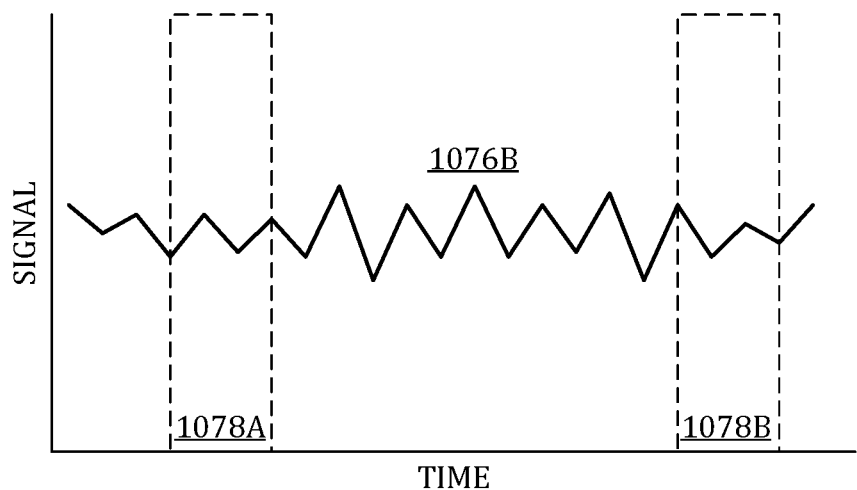

However, in the event that the hand-touch state is 00 or 11, such that neither sensor can be preferred based on hand-touch, the synchronization logic is configured to enable the pen tracking conditionally, based on a waveform comparison of the first and second pen signals. In particular the synchronization logic advances to 974J, where the waveforms of the first and second pen signals are analyzed. At 974K pen tracking is enabled for the digitizer providing a pen-signal waveform consistent with interaction of a pen on a touch screen, as opposed to noise. The detailed method of the waveform analysis is not particularly limited, but FIG. 10 provides one illustrative example. The plot in this drawing compares two hypothetical pen signals 1076A and 1076B, each sampled over an earlier sampling window 1078A and over a later sampling window 1078B. The amplitude of pen signal 1076A is lower in later sampling window 1078B than in earlier sampling window 1078A, consistent with the predicted decay of real signal as a function of time. In contrast, the amplitude of pen signal 1076B is about the same in the earlier and later sampling windows, consistent with random noise. The useful technical effect of waveform comparison is manifest in scenarios in which there is no basis on which to decide which pen signal to track based on the sync time, synchronization state, and/or hand-touch state. Only when these metrics fail to provide useful discrimination is analysis of the waveform attempted.

Irrespective of the detailed method of waveform analysis and comparison, the synchronization logic may be configured to expose a waveform state for subsequent use in method 700. For a system of two touch-screen sensors the waveform state may take binary values of 00, 01, 10, and 11. Waveform state 00 indicates that neither the first nor the second pen signal is consistent with interaction of a pen on a touch-screen sensor. Waveform states 01 and 10 indicate that only the first or second pen signal, respectively, is consistent with interaction of a pen on a touch-screen sensor, and waveform state 11 indicates that both the first and second pen signals are consistent with interaction of a pen on a touch-screen sensor.

Figure 11:
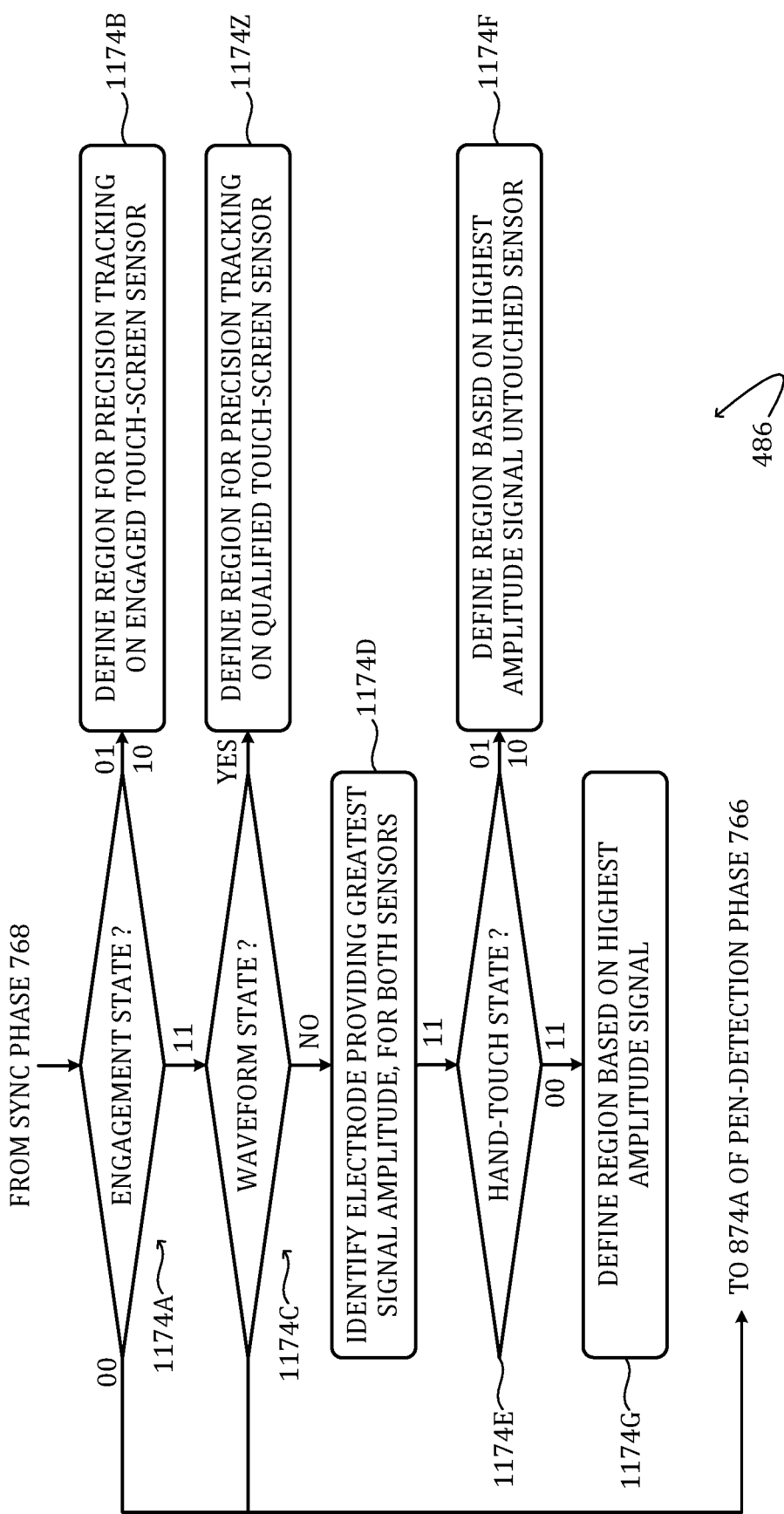
FIG. 11 shows aspects of an example pen-tracking phase of the method of FIG. 7.

FIG. 11 shows aspects of an example pen-tracking phase 770 of method 700. The reader will note that pen tracking in a touch-screen system involves 'full-range' tracking—when the pen position is totally unpredictable—in addition to 'precision' tracking based on a reliable prior estimate of the pen position. Full-range tracking is enacted after a digitizer has initially passed synchronization, for example, or after the user has moved the pen tip away from the synchronized sensor. Precision tracking uses the prior pen position to define a region for precision scanning of the touch-screen sensor on which the pen is more likely to be found.

In pen-tracking phase 770 the tracking logic defines, based at least partly on the first and second pen signals, a region of precision scanning of the first or second touch-screen sensor by the respective first or second digitizer. In some examples the tracking logic may be configured to define the region based at least partly on one or more of the engagement state, the hand-touch state, and the synchronization state, as defined hereinabove.

At 1174A the engagement state is again interrogated, this time by the tracking logic of the touch-screen system. If the engagement state is 01 or 10, indicating that the pen was detected only by the digitizer now tracking the pen position, then the tracking logic defines, at 1174B, a region for precision tracking on the engaged touch-screen sensor. The tracking logic is configured to otherwise define the region based on an amplitude or waveform comparison of the first and second pen signals. Thus, amplitude or wavelength comparison may reveal a preference among the pen signals even in the event that previous attempts at discrimination are ambiguous, providing yet another technical advantage. In particular, if the pen was detected on both sensors, by both digitizers, then the tracking logic proceeds to 1174C, where the waveforms of the first and second pen signals are analyzed—e.g., in the manner described above. The tracking logic now interrogates the waveform state. If the waveform state is 00, indicating that neither pen signal is consistent with a pen signal, then the method returns to 874A of pen-detection phase 766. If the waveform state is 01 or 10, indicating that only one of the signals is consistent with a pen signal, then the tracking logic defines, at 1174Z, a region on whichever sensor has provided such signal. However, if the waveform state is 11, indicating that both waveforms are consistent with a pen signal, then at 1174D the tracking logic identifies, for each touch-screen sensor, the column electrode providing the signal of greatest amplitude and also interrogates the hand-touch state for that column electrode in particular, at 1174E. If the hand-touch state is 01 or 10, then the tracking logic defines at 1174F the region based on the untouched column electrode of greatest amplitude. If the hand-touch state is 00 or 11, then the tracking logic defines the region based on the larger of the maximum amplitudes, at 1174G.

Returning briefly to FIG. 7, in pen-reporting phase 772 of method 700, return logic of the touch-screen system exposes the result of the precision scanning to the operating system of the touch-screen system.

No aspect of the foregoing drawings or description should be interpreted in a limiting sense, because numerous variations, additions, and omissions are also envisaged. As noted above, the methods herein may be tied to a computer system of one or more computing devices. Such methods and processes may be implemented as an application program or service, an application programming interface (API), a library, and/or other computer-program product.

FIG. 12 provides a schematic representation of a computer system 1280 configured to provide some or all of the computer system functionality disclosed herein. Computer system 1280 may take the form of a personal computer, application-server computer, or any other computing device.

Computer system 1280 includes a logic system 1282 and a computer-memory system 1284. Computer system 1280 may optionally include a display system 1286, an input system 1288, a network system 1290, and/or other systems not shown in the drawings.

Logic system 1282 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 1284 includes at least one physical device configured to temporarily and/or permanently hold computer system information, such as data and instructions executable by logic system 1282. When the computer-memory system includes two or more devices, the devices may be collocated or remotely located. Computer-memory system 1284 may include at least one volatile, nonvolatile, dynamic, static, read/write, read-only, random-access, sequential-access, location-read addressable, file-read addressable, and/or content-read addressable computer-memory device. Computer-memory system 1284 may include at least one removable and/or built-in computer-memory device. When the logic system executes instructions, the state of computer-memory system 1284 may be transformed—e.g., to hold different data.

Aspects of logic system 1282 and computer-memory system 1284 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 1282 and computer-memory system 1284 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 1286 may be used to present a visual representation of data held by computer-memory system 1284. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 1288 may comprise or interface with one or more input devices. An input device may include a sensor device or a user input device. Examples of user input devices include a keyboard, mouse, or touch screen.

When included, network system 1290 may be configured to communicatively couple computer system 1280 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a touch-screen system comprising adjacent first and second touch-screen sensors, first and second digitizers, and synchronization, tracking, and return logic. Each of the first and second digitizers is coupled electronically to the respective touch-screen sensor and configured to provide a pen signal responsive to action of a pen on the touch-screen sensor. The synchronization logic is configured to synchronize the pen to the first and second digitizers and to enable pen tracking by any of the first and second digitizers conditionally, based at least partly on the first and second pen signals. The tracking logic is configured to define a region of precision scanning of the first or second touch-screen sensor by the respective first or second digitizer, based at least partly on the first and second pen signals. The return logic is configured to expose a result of the precision scanning to an operating system of the touch-screen system. This configuration provides numerous technical effects, including preventing one or both of the digitizers from attempting to synchronize and track on random noise instead of actual pen signal. The conditional logic enumerated below further amplifies these technical effects.

In some implementations, the touch-screen system further comprises submission logic configured to submit any of the first and second pen signals conditionally to the synchronization logic, based at least partly on the first and second pen signals. In some implementations, the first and second pen signals define an engagement state of the pen with respect to the first and second touch-screen sensors, and the submission logic is configured to submit the any of the first and second pen signals conditionally, based at least partly on the engagement state. In some implementations, the synchronization logic is configured to enable the pen tracking conditionally, based at least partly on the engagement state. In some implementations, the tracking logic is configured to define the region based at least partly on the engagement state. In some implementations, the submission logic is configured to submit the any of the first and second pen signals conditionally, based at least partly on a timing of the first and second pen signals. In some implementations, the submission logic is configured to submit the any of the first and second pen signals conditionally, based at least partly on a frequency of the first and second pen signals. In some implementations, the first and second pen signals define a hand-touch state of the respective first and second touch-screen sensors, and the submission logic is configured to submit the any of the first and second pen signals conditionally, based at least partly on the hand-touch state. In some implementations, the synchronization logic is configured to enable the pen tracking conditionally, based at least partly on the hand-touch state. In some implementations, the tracking logic is configured to define the region based at least partly on the hand-touch state. In some implementations, the synchronization logic is configured to assess a synchronization state of the first and second digitizer with respect to the pen and to enable the pen tracking conditionally based at least partly on the synchronization state. In some implementations, the synchronization logic is configured to compute a first sync time between the pen and the first digitizer and a second sync time between the pen and the second digitizer, and to enable the pen tracking conditionally based at least partly on the first and second sync times. In some implementations, the synchronization logic is configured to enable the pen tracking conditionally, based at least partly on waveform comparison of the first and second pen signals. In some implementations, the tracking logic is configured to define the region based at least partly on amplitude and/or waveform comparison of the first and second pen signals.

Another aspect of this disclosure relates to a method for reporting a path of a pen over adjacent first and second touch-screen sensors of a touch-screen system. The method comprises: (a) receiving first and second pen signals; (b) synchronizing the pen to the first and second digitizers based at least partly on the first and second pen signals; (c) enabling pen tracking by any of the first and second digitizers conditionally, based at least partly on the first and second pen signals; (d) defining, based at least partly on the first and second pen signals, a region of precision scanning of the first or second touch-screen sensor by the respective first or second digitizer; and (e) exposing a result of the precision scanning to an operating system of the touch-screen system. This method provides numerous technical effects, including preventing one or both of the digitizers from mistaking random noise for actual pen signal and attempting to synchronize and track on random noise instead of actual pen signal. The conditional logic enumerated below further amplifies these technical effects.

In some implementations, the first and second pen signals define an engagement state of the pen with respect to the first and second touch-screen sensors, and the synchronizing and enabling are based at least partly on the engagement state. In some implementations, the first and second pen signals define a hand-touch state of the first and second touch-screen sensors, and the synchronizing and enabling are based at least partly on the hand-touch state. In some implementations, synchronizing yields a synchronization state and enabling is based at least partly on the synchronization state. In some implementations, the region is defined is based at least partly on one or more of the engagement state, the hand-touch state, and the synchronization state.

Another aspect of this disclosure is directed to a touch-screen system comprising adjacent first and second touch-screen sensors, first and second digitizers, and submission, synchronization, tracking, and return logic. Each of the first and second digitizers is coupled electronically to the respective touch-screen sensor and configured to provide a pen signal responsive to action of a pen on the touch-screen sensor. The submission logic is configured to submit any of the first and second pen signals conditionally to the synchronization logic, based at least partly on the first and second pen signals. The synchronization logic is configured to synchronize the pen to the first and second digitizers and to enable pen tracking by any of the first and second digitizers conditionally, based at least partly on the first and second pen signals. The tracking logic is configured to define a region of precision scanning of the first or second touch-screen sensor by the respective first or second digitizer, based at least partly on the first and second pen signals. The return logic is configured to expose a result of the precision scanning to an operating system of the touch-screen system.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-screen system comprising:
adjacent first and second touch-screen sensors;
a first digitizer coupled electronically to the first touch-screen sensor and configured to provide a first pen signal responsive to action of a pen on the first touch-screen sensor;
a second digitizer coupled electronically to the second touch-screen sensor and configured to provide a second pen signal responsive to action of the pen on the second touch-screen sensor;
synchronization logic configured to synchronize the pen to the first and second digitizers and to enable pen tracking by any of the first and second digitizers conditionally, based at least partly on the first and second pen signals;
tracking logic configured to define a region of precision scanning of the first or second touch-screen sensor by the respective first or second digitizer, based at least partly on the first and second pen signals; and
return logic configured to expose a result of the precision scanning to an operating system of the touch-screen system.

2. The touch-screen system of claim 1 further comprising submission logic configured to submit any of the first and second pen signals conditionally to the synchronization logic, based at least partly on the first and second pen signals.

3. The touch-screen system of claim 2 wherein the first and second pen signals define an engagement state of the pen with respect to the first and second touch-screen sensors, and wherein the submission logic is configured to submit the any of the first and second pen signals conditionally, based at least partly on the engagement state.

4. The touch-screen system of claim 3 wherein the synchronization logic is configured to enable the pen tracking conditionally, based at least partly on the engagement state.

5. The touch-screen system of claim 3 wherein the tracking logic is configured to define the region based at least partly on the engagement state.

6. The touch-screen system of claim 2 wherein the submission logic is configured to submit the any of the first and second pen signals conditionally, based at least partly on a timing of the first and second pen signals.

7. The touch-screen system of claim 2 wherein the submission logic is configured to submit the any of the first and second pen signals conditionally, based at least partly on a frequency of the first and second pen signals.

8. The touch-screen system of claim 2 wherein the first and second pen signals define a hand-touch state of the respective first and second touch-screen sensors, and wherein the submission logic is configured to submit the any of the first and second pen signals conditionally, based at least partly on the hand-touch state.

9. The touch-screen system of claim 8 wherein the synchronization logic is configured to enable the pen tracking conditionally, based at least partly on the hand-touch state.

10. The touch-screen system of claim 8 wherein the tracking logic is configured to define the region based at least partly on the hand-touch state.

11. The touch-screen system of claim 1 wherein the synchronization logic is configured to assess a synchronization state of the first and second digitizer with respect to the pen and to enable the pen tracking conditionally based at least partly on the synchronization state.

12. The touch-screen system of claim 1 wherein the synchronization logic is configured to compute a first sync time between the pen and the first digitizer and a second sync time between the pen and the second digitizer, and to enable the pen tracking conditionally based at least partly on the first and second sync times.

13. The touch-screen system of claim 1 wherein the synchronization logic is configured to enable the pen tracking conditionally, based at least partly on waveform comparison of the first and second pen signals.

14. The touch-screen system of claim 1 wherein the tracking logic is configured to define the region based at least partly on amplitude and/or waveform comparison of the first and second pen signals.

15. A method for reporting a path of a pen over adjacent first and second touch-screen sensors of a touch-screen system, the method comprising:
receiving first and second pen signals;
synchronizing the pen to first and second digitizers based at least partly on the first and second pen signals, the first and second digitizers coupled electronically to the first and second touch-screen sensors, respectively, and configured to provide respective first and second pen signals responsive to action of the pen on the first and second touch-screen sensors;

enabling pen tracking by any of the first and second digitizers conditionally, based at least partly on the first and second pen signals;

defining, based at least partly on the first and second pen signals, a region of precision scanning of the first or second touch-screen sensor by the respective first or second digitizer;

exposing a result of the precision scanning to an operating system of the touch-screen system.

16. The method of claim 15 wherein the first and second pen signals define an engagement state of the pen with respect to the first and second touch-screen sensors, and wherein the synchronizing and enabling are based at least partly on the engagement state.

17. The method of claim 16 wherein the first and second pen signals define a hand-touch state of the first and second touch-screen sensors, and wherein the synchronizing and enabling are based at least partly on the hand-touch state.

18. The method of claim 17 wherein synchronizing yields a synchronization state and enabling is based at least partly on the synchronization state.

19. The method of claim 18 wherein the region is defined is based at least partly on one or more of the engagement state, the hand-touch state, and the synchronization state.

20. A touch-screen system comprising:

adjacent first and second touch-screen sensors;

a first digitizer coupled electronically to the first touch-screen sensor and configured to provide a first pen signal responsive to action of a pen on the first touch-screen sensor;

a second digitizer coupled electronically to the second touch-screen sensor and configured to provide a second pen signal responsive to action of the pen on the second touch-screen sensor;

submission logic configured to submit any of the first and second pen signals conditionally to a synchronization logic, based at least partly on the first and second pen signals;

the synchronization logic configured to synchronize the pen to the first and second digitizers and to enable pen tracking by any of the first and second digitizers conditionally, based at least partly on the first and second pen signals;

tracking logic configured to define a region of precision scanning of the first or second touch-screen sensor by the respective first or second digitizer, based at least partly on the first and second pen signals; and return logic configured to expose a result of the precision scanning to an operating system of the touch-screen system.

* * * * *